(12) United States Patent
Williams et al.

(10) Patent No.: US 10,096,226 B2
(45) Date of Patent: Oct. 9, 2018

(54) SYSTEMS AND METHODS FOR ACCIDENT NOTIFICATION

(71) Applicants: Reed Williams, Hot Springs, VA (US); Aram Kovach, Westerville, OH (US)

(72) Inventors: Reed Williams, Hot Springs, VA (US); Aram Kovach, Westerville, OH (US)

( * ) Notice: Subject to any disclaimer, the term of this patent is extended or adjusted under 35 U.S.C. 154(b) by 0 days.

(21) Appl. No.: 15/591,481

(22) Filed: May 10, 2017

(65) Prior Publication Data

US 2017/0330436 A1    Nov. 16, 2017

Related U.S. Application Data

(60) Provisional application No. 62/334,134, filed on May 10, 2016.

(51) Int. Cl.
| | |
|---|---|
| *G08B 1/08* | (2006.01) |
| *G08B 21/02* | (2006.01) |
| *G08B 21/18* | (2006.01) |
| *G08B 25/01* | (2006.01) |
| *G08B 25/00* | (2006.01) |

(52) U.S. Cl.
CPC ..... *G08B 21/0269* (2013.01); *G08B 21/0236* (2013.01); *G08B 21/182* (2013.01); *G08B 25/016* (2013.01); *G08B 25/001* (2013.01); *H04M 2250/10* (2013.01); *H04M 2250/12* (2013.01)

(58) Field of Classification Search
CPC ............ G08B 21/0269; G08B 21/0236; G08B 21/182; G08B 25/016; G08B 25/001; H04M 2250/10; H04M 2250/12

USPC ..................................................... 340/539.13
See application file for complete search history.

(56) References Cited

U.S. PATENT DOCUMENTS

| | | | | |
|---|---|---|---|---|
| 2009/0278678 | A1* | 11/2009 | Krotkov | B60Q 1/444 340/467 |
| 2013/0069802 | A1* | 3/2013 | Foghel | G08G 1/205 340/989 |
| 2014/0025225 | A1* | 1/2014 | Armitage | B60W 40/09 701/1 |
| 2015/0172894 | A1* | 6/2015 | Gabel | H04W 4/22 455/404.2 |
| 2016/0094964 | A1* | 3/2016 | Barfield, Jr. | H04W 4/22 455/404.2 |

(Continued)

*Primary Examiner* — Brian Zimmerman
*Assistant Examiner* — Thang Tran
(74) *Attorney, Agent, or Firm* — Benesch, Friedlander, Coplan & Aronoff LLP

(57) ABSTRACT

This disclosure relates to systems and methods for summoning emergency personnel to assist a user associated with a portable device. A system can include a processor that can access non-transitory memory and execute machine readable instructions stored therein. The machine readable instructions can cause the processor to receive an assistance request generated by the portable device. The request can include location information for the portable device. The machine readable instructions can further cause the processor to transmit an assistance summons request to one or more selected devices that the user is need of assistance, receive a confirmation message generated by at least one of the one or more selected devices confirming that the user associated with the portable device is need of the assistance, and transmit one or more notification messages to summon the emergency personnel for the user.

19 Claims, 6 Drawing Sheets

(56) References Cited

U.S. PATENT DOCUMENTS

2016/0217669 A1\* 7/2016 Benoit .................. G08B 21/02
2017/0101054 A1\* 4/2017 Dusane ................. G08G 1/127
2017/0195166 A1\* 7/2017 Keerthi ............. G01C 21/3484

\* cited by examiner

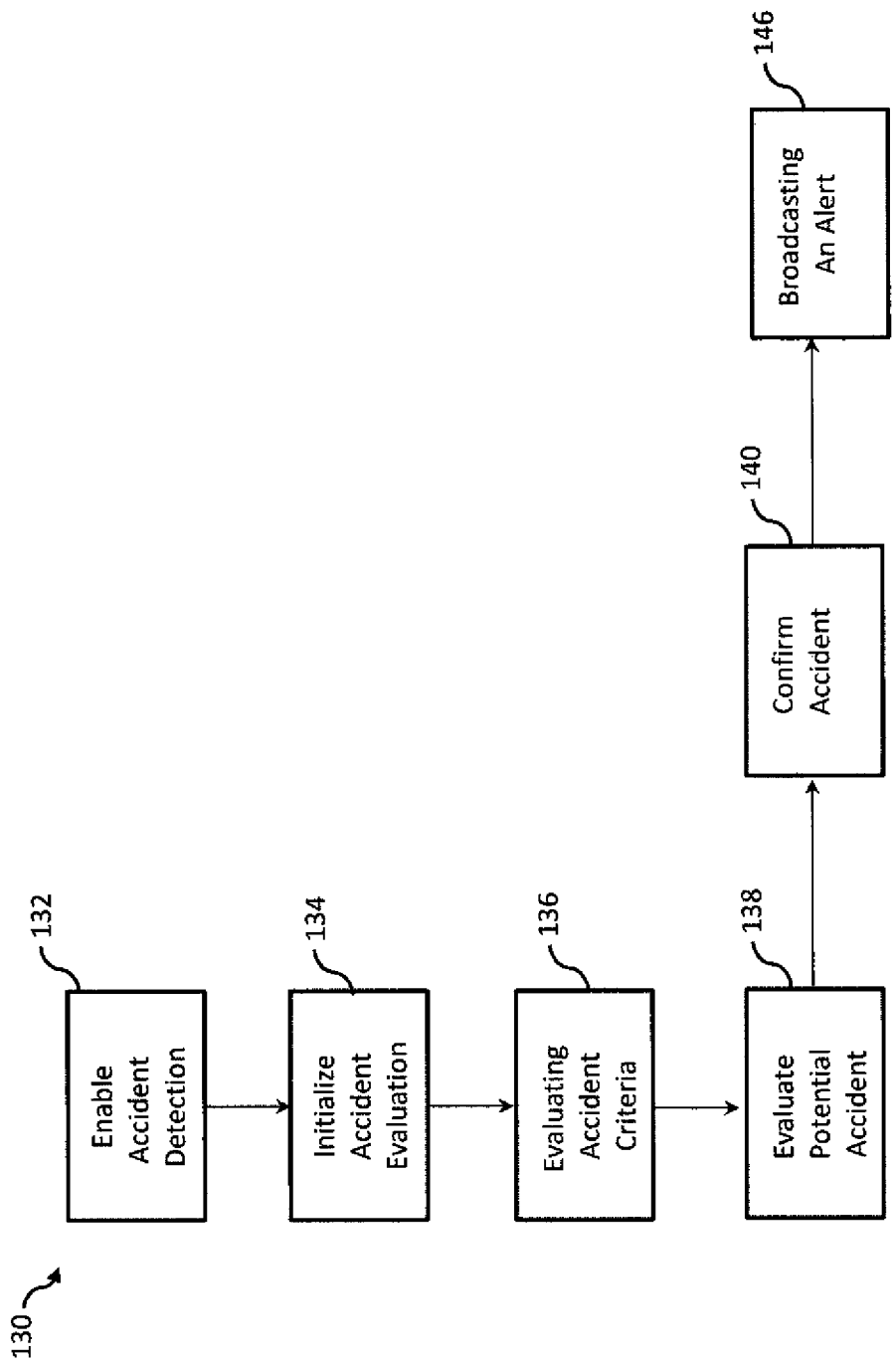

SYSTEMS AND METHODS FOR ACCIDENT NOTIFICATION

CROSS-REFERENCED TO RELATED APPLICATION

This application claims the benefit of U.S. Provisional Application No. 62/334,134, filed on May 10, 2016, entitled "SYSTEMS, METHODS, AND MOBILE DEVICES FOR ACCIDENT NOTIFICATION", the contents of which is incorporated herein by reference.

TECHNICAL FIELD

This disclosure relates to systems and methods for generating notifications, such as accident notifications.

BACKGROUND

Mobile devices (e.g., smartphones) ownership and usage are increasing year over year. Due to the portable nature of mobile devices, many users carry and use their mobile device throughout their waking hours. With the increasing ubiquity of mobile devices, each user is becoming increasingly interconnected with other users. For example, through voice calls, email, social networking, text messaging, and the like, a user can nearly instantly communicate with another user. Moreover, these communications can take place from any location that is reachable via a wireless network protocol. Accordingly, users can communicate nearly instantly from nearly any geographical location.

The aforementioned communication requires cognitive input from the user to initiate or reciprocate communication. Thus, the mobile device is only useful when the user is capable of providing cognitive input. In many critical situations, the user may be incapable of providing cognitive input to indicate a desire to communicate. For example, the user may become incapacitated during an accident and thus be unable to provide the cognitive input required by the mobile device to summon assistance.

Accordingly, a need exists for alternative systems and methods for generating accident notifications.

SUMMARY

In one example, a portable device can include non-transitory memory that can store machine readable instructions and data. The portable device can further include a sensing system that can be configured to generate a sensed signal indicative of one of a sensed motion and an audio detected by the sensing system. The portable device can further include a processor that can access the non-transitory memory and execute the machine readable instructions. The machine readable instructions can cause the processor to generate an alert based on the sensed signal, encode an assistance request comprising location information for the portable device in response to the alert, and transmit the encoded request to a server to cause the server to transmit an assistance summons request to one or more selected devices that a user associated with the portable device is need of assistance.

In another example, a system can include non-transitory memory that can store machine readable instructions and data. The system can further include a processor that can access the non-transitory memory and execute the machine readable instructions. The machine readable instructions can cause the processor to receive an assistance request generated by a portable device associated with a user. The request can include location information for the portable device. The machine readable instructions can further cause the processor to transmit an assistance summons request to one or more selected devices that the user associated with the portable device is need of assistance.

BRIEF DESCRIPTION OF THE DRAWINGS

FIG. 5 depicts an example of a flow diagram illustrating an example of a method for generating accident notifications.

DETAILED DESCRIPTION

Figure 1:
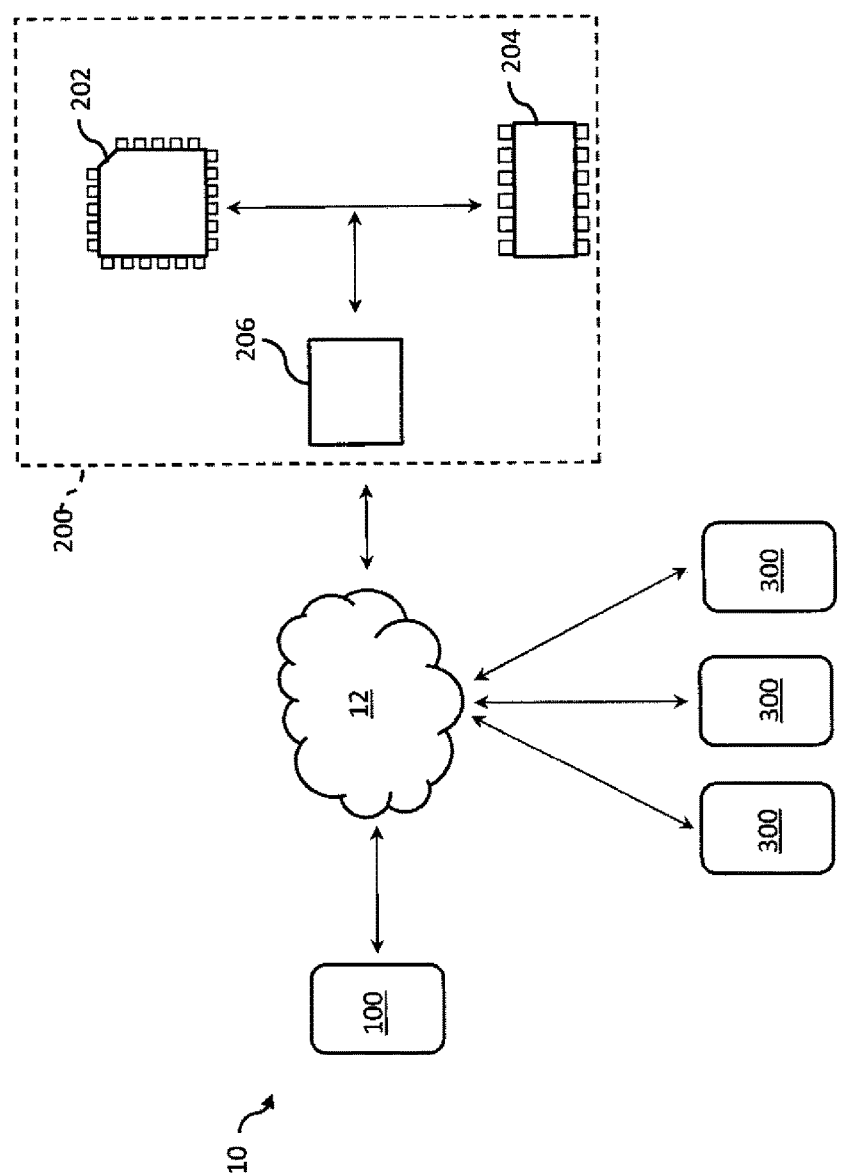
FIG. 1 depicts an example of a system for generating accident notifications.

FIG. 1 illustrates an example of a system 10 for generating accident notifications. The system 10 can be used to implement methods described herein. The system 10 can include a monitoring device 100, an accident notification server 200, and one or more guardian devices 300. According to the examples described herein, the accident notification server 200 can be configured to automatically broadcast a request for assistance and summon help in response to a request from the monitoring device 100.

Figure 2:
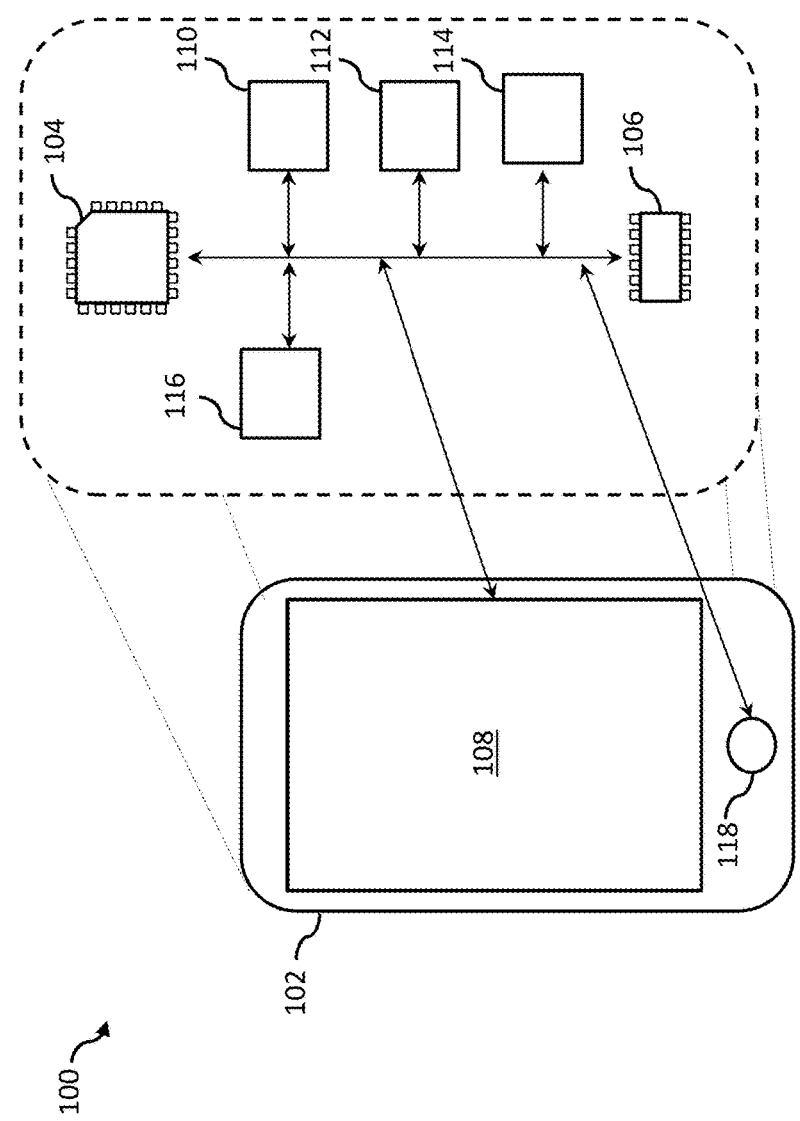
FIG. 2 depicts an example of a monitoring device.

FIG. 2 illustrates the monitoring device of FIG. 1. In FIG. 2, the monitoring device 100 can include a smart phone 102. It is noted that the description provided herein regarding the smart phone 102 is for clarity, and is not intended to limit the description to any specific machine. Various machines can be utilized without departing from the scope of the examples described herein such as, for instance, a mobile phone, a tablet, a laptop computer, desktop computer, or a specialized machine having communication capability. The smart phone 102 can include one or more processors 104 that can be configured to execute machine readable instructions to perform functions according to the methods described herein. As used herein, the term "processor" can mean any device capable of executing machine readable instructions. Accordingly, each processor can be a controller, an integrated circuit, a microchip, or any other device capable of implementing logic. For example, the one or more processors 104 can include a touch screen controller, a baseband controller, graphics processor, application processor, image processor, or the like.

The smart phone 102 can include memory 106 communicatively coupled to the one or more processors 104 (generally depicted as double arrowed lines). The memory 106 described herein can be RAM, ROM, a flash memory, a hard drive, or any device capable of storing machine readable instructions. Accordingly, the smart phone 102 can implement a mobile operating system as machine readable instructions stored in the memory 106 and that can be accessed and executed by the one or more processors 104. For example, the mobile operating system can include, but is not limited to, Android, iOS, Blackberry OS, Windows Phone, Symbian, or the like.

Additionally, it is noted that the functions, modules, and processes described herein can be provided as machine readable instructions stored in the memory 106 and executed by the one or more processors 104. The machine readable instructions can be provided in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the functions, modules, and processes described herein may be written in a hardware description language (HDL), such as logic implemented via either a field-programmable gate array (FPGA) configuration or an application-specific integrated circuit (ASIC), and their equivalents. Accordingly, the functions, modules, and processes described herein can be implemented using conventional computer programming language, as pre-programmed hardware elements, or as a combination of hardware and software components.

The smart phone 102 can include a display 108 that can be communicatively coupled to the one or more processors 104 to provide optical signals, and conveying visual feedback to users of the smart phone 102. In some examples, the display 108 can be configured to selectively illuminate a plurality of pixels to provide the optical signals. Accordingly, the display can include light emitting diodes (LED or OLED), liquid crystal display (LCD), liquid crystal on silicon (LCOS), or the like. Additionally, the display 108 can be configured to operate as a touch screen and can accept tactile input via one or more visual controls. Accordingly, the display 108 can include a touch detector such as, for example, a resistive sensor, capacitive sensor, or the like. It is noted that the term "signal," as used herein, can mean a waveform (e.g., electrical, optical, magnetic, or electromagnetic), such as direct-current (DC), alternating-current (AC), sinusoidal-wave, triangular-wave, square-wave, and the like, capable of traveling through a medium. It should be understood that the term "optical" can refer to various wavelengths of the electromagnetic spectrum such as, but not limited to, wavelengths in an ultraviolet (UV), an infrared (IR), and a visible portion of the electromagnetic spectrum.

The smart phone 102 can further include network interface hardware 110 that can be communicatively coupled to the one or more processors 104 such that the smart phone 102 can be communicatively coupled to another device via a network such as, for example, a wide area network W(AN), a local area network (LAN), personal area network (PAN), a global positioning system (GPS) and combinations thereof. Accordingly, the network interface hardware 110 can be configured to communicate, e.g., send and/or receive data signals via any wired or wireless communication protocol. For example, the network interface hardware 110 can include an antenna, a modem, LAN port, wireless fidelity (Wi-Fi) card, WiMax card, near-field communication hardware, satellite communication hardware, or the like. Accordingly, the smart phone 102 can be communicatively coupled to a network via wires, via the WAN, via the LAN, via the PAN, via a satellite network, or the like. For example, the LAN can include wired Ethernet and/or wireless technologies such as, for instance, Wi-Fi. Suitable personal area networks can include wireless technologies such as, for example, IrDA, BLUETOOTH, Wireless USB, Z-WAVE, ZIGBEE, or the like. Alternatively or additionally, PANs can include wired computer buses such as, for example, USB and FIREWIRE. Thus, any components of the smart phone 102 can utilize one or more network components to communicate signals via the Internet or World Wide Web.

The smart phone 102 can further include radio frequency (RF) hardware 112 that can be communicatively coupled to the one or more processors 104 to communicatively coupling the smart phone 102 with a cellular network. The cellular network can include, but is not limited to, technologies such as, Long-Term Evolution (LTE), Worldwide Interoperability for Microwave Access (WiMAX), Universal Mobile Telecommunication System (UMTS), Code Division Multiple Access (CDMA), or Global System for Mobile Communication (GSM). In one example, the RF hardware 112 can include one or more components that can communicate voice information and/or data signals such as, for example, modems, attenuators, antennas, antenna switches, amplifiers, receivers, transceivers, or combinations thereof. Accordingly, the smart phone 102 described herein can utilize a cellular network to communicate signals over the Internet or World Wide Web.

The smart phone 102 can further include a GPS receiver 114 that can be communicatively coupled to the one or more processors 102. The GPS receiver 114 can be configured to provide one or more signals characterizing of a location (e.g., geographical location) of the geo-sensing device 100. For example, the GPS receiver 114 can receive signals encoded with location data, time data or both from a plurality of GPS satellites.

The smart phone 102 can further include one or more motion sensors 116 that can be configured to detect motion of the smart phone 102. The one or more motion sensors 116 can include an accelerometer, a gyroscope, a magnetometer, combinations thereof, or the like. Accordingly, the one or more motion sensors 116 can be configured to provide signals characterizing an orientation or position of the smart phone 102, which can be used to determine a velocity or an acceleration of the smart phone 102.

The smart phone 102 can further include one or more input component 118 that can be configured to sense input and encode the sensed input into a signal. For example, the input component 116 can include a microphone, a button, a knob, a switch, a resistive sensor, capacitive sensor, a camera, a microphone, a keyboard, or the like. Alternatively or additionally, the display 108 can be configured to receive user input and operate as the input component 116. The smart phone 102 can further include one or more additional components that can be communicatively coupled to the one or more processors 104 without departing from the scope of the embodiments described herein. The one or more additional components can include, but is not limited to, speakers, accessory lights (e.g., LED), an optical sensor, or the like.

Referring again to FIG. 1, The accident notification server 200 can be configured to host an enterprise application that can provide accident notifications to the one or more guardian devices 300. The accident notification server 200 can include one or more processors 202 that can be communicatively coupled to memory 204. The one or more processors 202 can further be communicatively coupled to network interface hardware 206. It is noted that, while the accident notification server 200 is depicted in FIG. 1 as being a single machine, each of the one or more processors 202, the memory 204, and the network interface hardware 206 can be distributed amongst a plurality of machines that can be communicatively coupled to one another. Accordingly, the accident notification server 200 can be scaled to include any number of machines suitable that can support any number of monitoring devices 100 and guardian devices 300. In one example, the one or more processors 202 can be configured to execute web server software that can be provided as machine readable instructions that can be, for example, stored in the memory 204. For example, the web server software can include, but is not limited to, an Apache HTTP Server, Internet Information Services, Nginx, Google Web Server, or the like. Accordingly, the accident notification server 200 can utilize a server operating system such as, for example, Unix, Linux, BSD, Microsoft Windows, or the like. In one example, the accident notification server 200 can be communicatively coupled with the monitoring device 100 and the one or more guardian devices 300 over an Internet 12.

Figure 3:
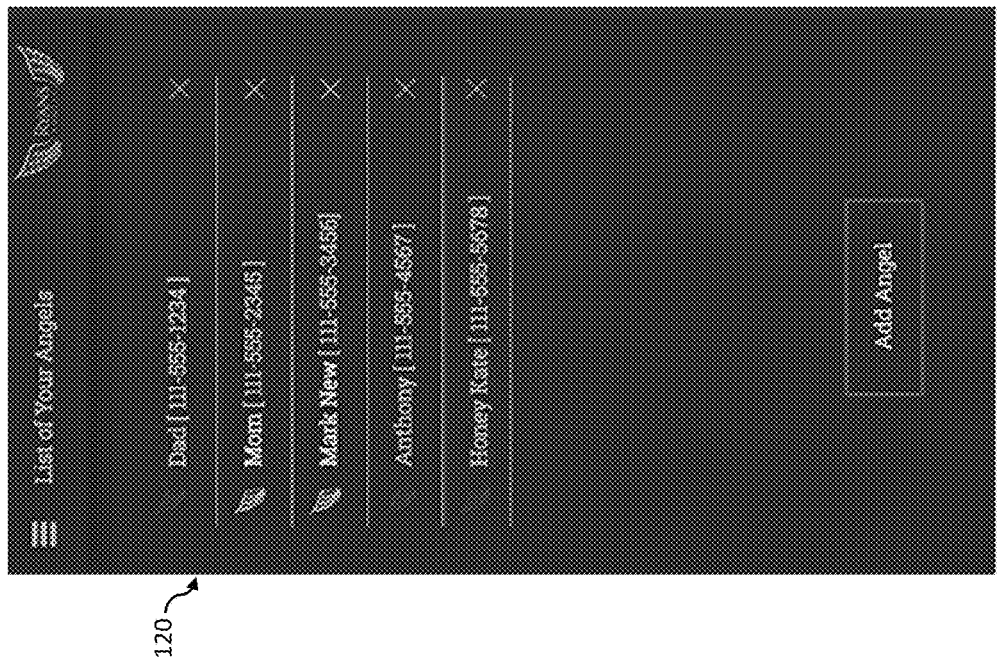
Figure 7:
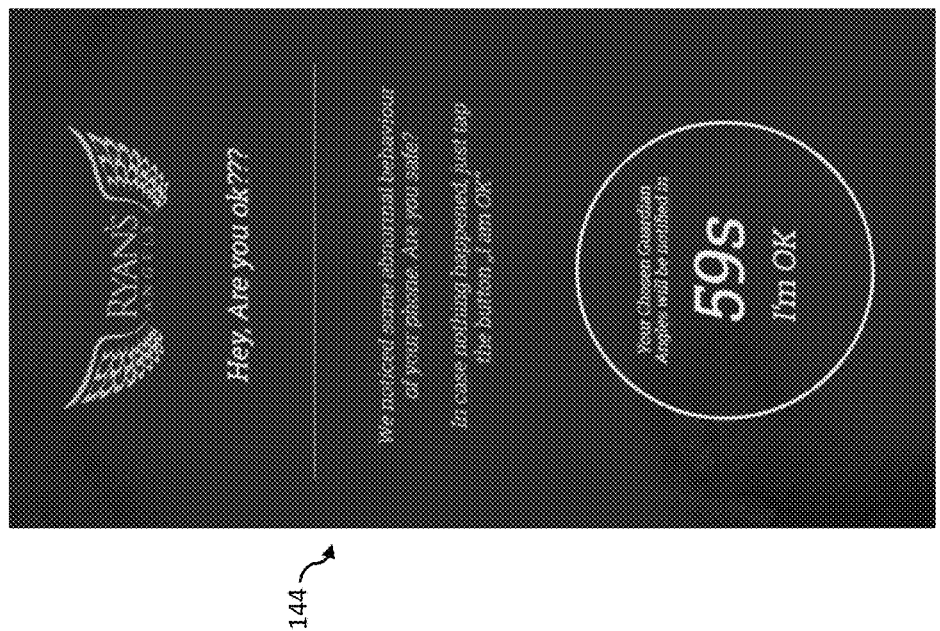
FIG. 7 depicts an example of a user interface.
Figure 6:
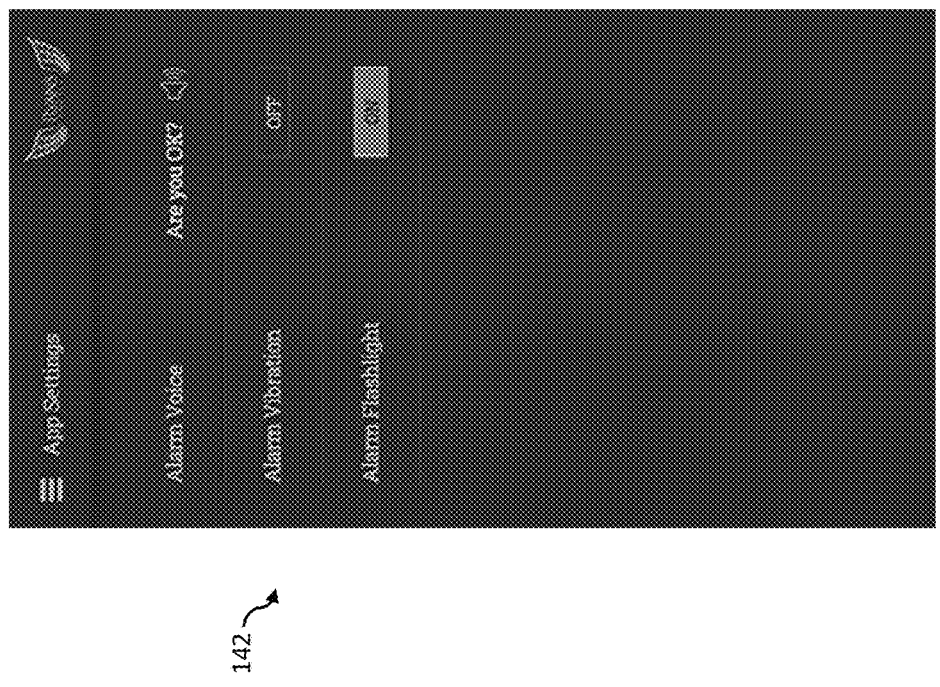
FIG. 6 depicts an example of a user interface.

Referring collectively to FIGS. 1, 2, and 3, the accident notification server 200 can be configured to form an association between the monitoring device 100 and one or more guardian devices 300. In one example, the one or more processors 104 of the monitoring device 100 can be configured to execute machine readable instructions that can provide a user interface 120 for selecting a guardian device on the display 108. The user interface 120 can provide objects identifying one or more candidate devices by contact information, e.g., a phone number, an email address, or the like. For example, the candidate device objects can be populated using the contact information stored in the memory 106. The user interface 120 can be configured to receive one or more user inputs indicative of a selection of one or more the candidate devices. The monitoring device 100 can provide notification data characterizing the one or more candidate devices selected in response to the one or more inputs to the accident notification server 200.

Figure 4:
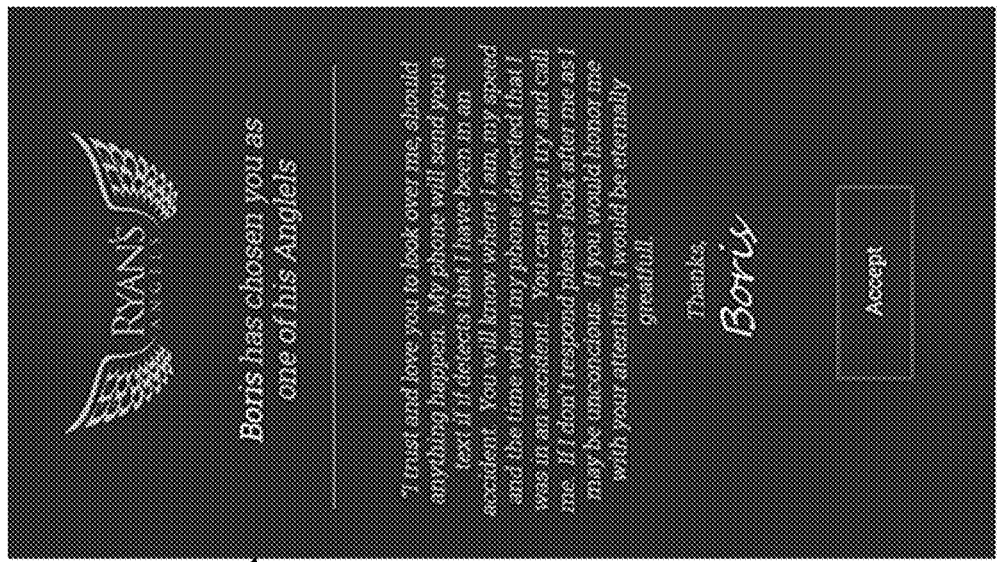
FIGS. 3 and 4 depict examples of user interfaces.

Referring collectively to FIGS. 1, 2, and 4, the accident notification server 200 can be configured to automatically notify one or more users associated with one or more candidate devices based on the notification data. In one example, the one or more candidate devices can be provided with a user interface 122 that the one or more users can interact with to accept the selection such as, for example, via a smart phone application or a web interface. Once the one or more users via the one or more candidate devices has accepted the selection, the one or more candidate devices can be associated with the monitoring device 100 as one or more of the guardian devices 300.

Referring collectively to FIGS. 1, 2 and 5, the one or more processors 104 of the monitoring device 100 can be configured to execute machine readable instructions to perform a method 130 for detecting an accident. The method 130 can include a process 132 that can enable an accident detection via the motion sensor 116 of the smart phone 102. For example, acceleration values can be monitored when the GPS receiver 114 provides a GPS speed that is greater than a min_needed_speed_for_detection parameter. In some examples, when the GPS receiver 114 provides a GPS speed that is less than the min_needed_speed_for_detection parameter, the acceleration values are not monitored, which can improve a battery consumption rate of the smart phone 102.

If the GPS speed is below a GPS speed threshold (e.g., the min_needed_speed_for_detection parameter), the GPS speed can be sampled at a lower sample rate such as, for example, about every 2 minutes according to a gps_refresh_time_when_speed_is_low parameter. If the GPS speed is higher than the GPS speed threshold, the GPS speed can be sampled at a higher sample rate such as, about every 30 seconds according to a gps_refresh_time_when_speed_is_high parameter. In one example, the one or more processors 104 can be configured to automatically switch between the low sample rate ("low speed mode") and the high sample rate ("high speed mode") based on the GPS speed. For example, to switch to high speed mode, a single GPS speed instance needs to be greater than the min_needed_speed_for_detection parameter. To switch from high speed mode to low speed mode and disable accident detection/recording, a plurality of GPS speed instances (e.g., about 4) need to be less than the min_needed_speed_for_detection parameter. Alternatively or additionally, when the GPS speed is unavailable, e.g., during a startup, loss of a GPS signal, etc., accident detection can be automatically enabled and signals from the motion sensor 116 of the smart phone 102 can be sampled. When an accident is triggered, the signals from the GPS receiver 114 can be read and uploaded to the accident notification server 200. If the GPS receiver 114 does not return any values, the last known values can be used.

Referring collectively to FIGS. 1, 2 and 5, the method 130 can further include a process 134 that can initialize accident evaluation when a significant amount of motion is detected. In one example, if a sum of absolute values of the accelerometer values for each axis (absolute acceleration=|x|+|y|+|z|) reaches the abs_trigger_threshold (e.g., about 40), the accident evaluation can be initialized. During accident evaluation, a prior 10 seconds of acceleration data (buffer_time) can be recorded. Additionally, the acceleration data can be recorded for another 10 seconds after the accident evaluation is initialized (potential_accident_analysis_time). Should one or more additional events suitable to initialize the accident evaluation occur before the buffer time is complete, the acceleration data can be continuously recorded. After the analysis time expires, the contents of the buffer can be copied into an array and analyzed. The buffer can be reset to the last 10 seconds worth of data as data is continuously recorded.

The method 130 can further include a process 136 that can evaluate accident criteria. A potential accident can be triggered by evaluating multiple accident criteria. In one example, the absolute acceleration criteria can be used as an accident criteria. The multiple accident criteria can include determining the amount of time that the absolute acceleration is at a maximum level (e.g., maxed_out_acceleration_value parameter). If the amount of time is more than the min_total_time_maxed_out parameter, then the 3 axes can be checked again as separate time values. If the longest time of the axes is greater than the min_continuous_time_maxed_out then the time criteria of the accident criteria can be considered met. Accordingly, the time criteria can be met if the acceleration in any axis exceeds the allowed maximum for a given period of time.

The accident criteria can include an integration filter criteria. A "jerk" can correspond to a maximum deviation of a resultant acceleration that can show the change in acceleration. Without being bound to theory, it is believed that humans are acutely sensitive to a jerk. The jerk can be determined as: the absolute value of (value of earliest acceleration—following acceleration value)/time difference. A result of the jerk formula can provide a jerk value associated with motion between two consecutive measurements. The jerk value can be calculated for every signal or axis of the motion sensor 116 and a maximum value can be evaluated. If the maximum value is greater than a jerk threshold, the integration filter criteria can be considered met. In one example, the integration filter criteria can filter out high acceleration instances from typical everyday movements.

In a further example, the jerk threshold can be adaptive. For example, the jerk threshold can be automatically customized to any device depending on a motion sensor 116 sampling frequency (samples/sec). Generally, the sampling frequency can be between about 50 Hertz (Hz) and 100 Hz. Additionally, the sampling frequency can be by the current utilization of the one or more processors 104. The jerk threshold can be determined as: (2*maxed_out_acceleration_value)*3/(1/sampling frequency)*percent_of_max_possible_slope.

Without being bound to theory, it is believed that multiplication by 3 accounts for the resultant of the accelerometer sensor values as (sqrt(x*x+y*y+z*z)). The percent_of_max_possible_slope value can be required to fall between the minimum_acceleration_slope parameter and the maximum_acceleration_slope parameter. For example, if the jerk threshold is not between the minimum_acceleration_slope parameter and the maximum_acceleration_slope parameter, the jerk threshold can be assigned a closest value within the range. Alternatively, the maximum jerk value can be compared to the actual jerk threshold, e.g., without applying the range limitation.

Referring collectively to FIGS. 1, 2 and 5, the method 130 can further include a process 138 that can evaluate a potential accident. In one example, if all of the accident criteria are evaluated true, then the event can be classified as a potential accident. Alternatively or additionally, if only two of the accident criteria are evaluated as true, the accident criteria can be recalculated about 1 minute later according to the check_the_user_after_suspicious_event_this_much_time parameter. Alternatively or additionally, if only two of the accident criteria are evaluated as true, and if the GPS speed is 0 during any of the next 4 readings according to the check_if_speed_0_this_many_times_after_potential_accidents parameter, then the two criteria can cause the event to be classified as a potential accident.

Alternatively or additionally, the spread of acceleration signals during the first and last third of the recordings array, e.g., copied from 20 seconds of buffer, can be evaluated. If the spread value in the second range (later data, closest in time to 'now')*(after_accident_grav_multiplyer) is less than the values calculated for the first and third and also less than (after_accident_min_grav_dev), then the event can be classified as a potential accident. For example, the spread of acceleration signals can correspond to a smart phone 102 that was not moving in the last interval, e.g., stopped after accident, but was moving in the first interval. Accordingly, sudden stops and then motionless states can be detected.

Alternatively or additionally, at the process 138 free fall can be monitored. A sum of time spent in free fall, e.g., resultant acceleration less than freefall_limit_acceleration can be calculated for an entire recorded interval around the accident detection, e.g., copied from 20 seconds of buffer. If a sum of time spent in free fall is greater than a min_needed_freefall_time, the event can be classified as a potential accident regardless of a status of the other accident criteria. In one example, the sum of time spent in free fall can be correlated to height of a fall. Accordingly, the criteria can be used for detecting bike accidents, falls, skydiving, or the like.

Alternatively or additionally, the sum of acceleration spread values can be monitored. If the sum of acceleration spread values on 3 axes is less than after_accident_min_grav_dev, then the user can be considered to be motionless. A total motionless state can correspond to unconsciousness, because some base jerk/vibration is typically present during normal movement. Alternatively or additionally, the magnetometer can be evaluated for a motionless state. If the motionless state is detected, the event can be classified as a potential accident.

Alternatively or additionally, ambient acoustics can be monitored. At process 138, the microphone can record audio. The recorded audio can be compared to audio signatures such as, for example, exploding airbag. If the recorded audio corresponds to the audio signature, the event can be classified as a potential accident.

Referring collectively to FIGS. 2, 5, 6, and 7, the method 130 can further include a process 140 that can confirm an accident. In one example, in response to an event being classified as a potential accident, the one or more processors 104 can be configured to automatically initiate a local alarm using one or more components of the smart phone 102. For example, the local alarm can include audible alerts, visual alerts, tactile alerts or the like. In one example, a user interface 142 can be provided on the display 108 and can receive input to select the settings for the local alarm. The user interface 142 can be configured to receive input to collect data for registering as an organ donor, setting up do not resuscitate orders, setting up living wills, storing blood type, storing possible allergic reactions, or storing current medications.

The smart phone 102 can be configured to receive input from the user to confirm that the user is in need of assistance. In one example, a user interface 144 can be provided on the display 108 and receive input via the display 108 to cancel the alarm, e.g., the event can be reclassified as a non-accident. The user can be required to provide input within a given time period (e.g., countdown_time) in order to cancel the alarm. Alternatively or additionally, the input can be received by any input component 118. Accordingly, the input can be audible, visual, or tactile. Additionally, the user interface 144 can include a control that can indicate a false alarm after the given time period has expired. Accordingly, e.g., the event can be reclassified as a non-accident at any point in time after initiation.

Figure 8:
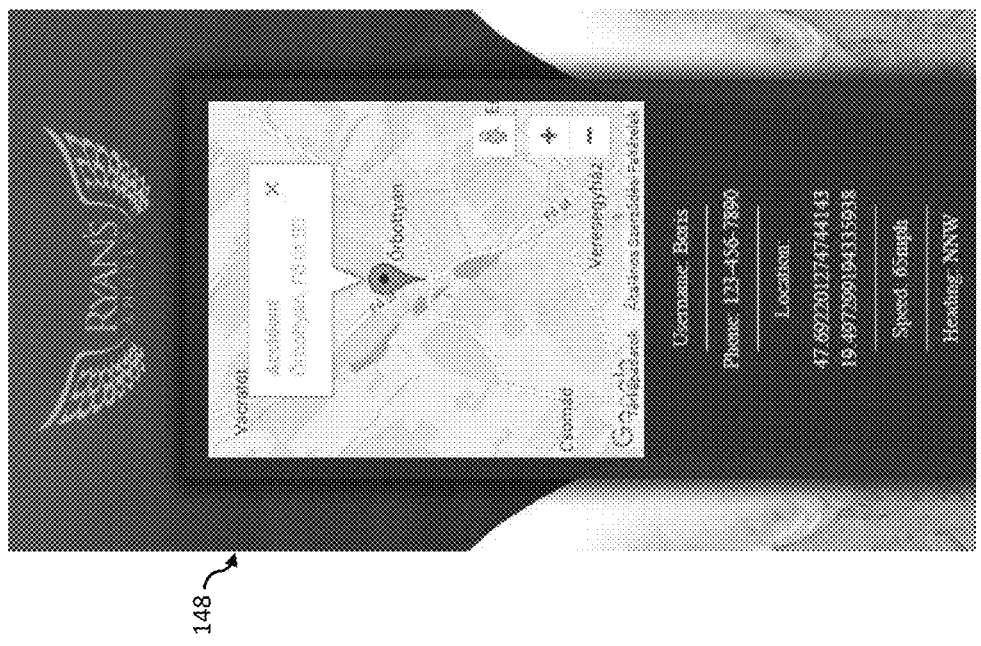
FIG. 8 depicts an example of a request for assistance.

Referring collectively to FIGS. 1, 5, and 8, the method 130 can further include a process 146 that can broadcasting an alert. Once the accident is confirmed, the monitoring device 100 can automatically communicate the alert to the accident notification server 200. The monitoring device can be configured to encode the alert with data derived from the signals from the GPS receiver 114 (e.g., location, heading, and speed). In one example, only one broadcast alert is triggered for an accident. The accident notification server 200 can communicate a request for assistance 148 to the one or more guardian devices 300 based on the alert.

The request for assistance 148 can be displayed on each of the one or more guardian devices 300. In response, any given number of the one or more guardian devices 300 can be configured to communicate a request to summon help to the accident notification server 200. In one example, the request to summon help can be configured as an "in app purchase." The accident notification server 200 can be configured to automatically contact emergency responders and provide the alert data to emergency responders, responsive to receipt of the request to summon help.

In an hour after an accident, the system 10 can be configured to provide means for communicating blood type, possible allergic reactions, or medications of the user associated with the accident to the first responders summoned to the scene of the accident. Additional functionality can be based upon age of the user. For example, a parent or guardian can configure the smart phone 102 of a minor so that an application implementing the examples described herein cannot be deleted without a passcode. Moreover, the accident notification server 200 can be configured to determine if two or more teenagers are in a car.

The examples provided herein can be configured to develop a network of monitoring devices 100 that communicate with the accident notification server 200. Accordingly, the accident notification server 200 can aggregate the data and automatically detected events based upon the aggregated data. For example, if the accident notification server 200 detects multiple possible accidents in close proximity of one another, e.g., a multiple car pileup in fog or snow, the accident notification server 200 can automatically notify emergency services to close down or alert other drivers of the possible pileup of cars up front. Additionally, the accident notification server 200 can send out an alert to others (e.g., other monitoring devices 100 or the one or more guardian devices 300) in the area approaching the accident pile up to slow down due to "Possible group accidents ahead."

Moreover, the data can be utilized to monitor and control traffic flow. For example, the position, velocity, or acceleration of the smart phone 102 can be used to generate vehicle position data. The aggregated vehicle position data can be used for adaptively controlling the frequency of traffic lights, which can reduce the occurrence of traffic jams. A sinusoidal algorithm can be used to characterize the vehicle position data, e.g., to distinguish between a slow-down caused by a single user spilling coffee at 6:00 AM from slow-down caused by a large volume of cars at 5 P.M. For example, if the same general location is correlated with reduced velocity of a large volume of vehicles, then the general location can be identified as a cause of the reduced velocity (e.g., a police officer or a sofa in the middle of the highway). Moreover, sudden changes in the velocity of a large group of vehicles can be used to identify a large accident.

Alternatively or additionally, registration information can be associated with one or more monitoring devices 100 that can be used to identify users who can respond to alerts, e.g., nurse, doctor, a user certified in Cardiopulmonary resuscitation (CPR), or the like. The accident notification server 200 can determine the proximity of a user who can respond to the alert of another user based on the location data and the registration data to. For example, the accident notification server 200 can be configured to automatically summon help from users within a predetermined radius such as, for example, about 500 yards.

Referring collectively to FIGS. 1 and 2, the smart phone 102 can be configured to communicate with a device that can collect additional user information such as, for example, a wearable (e.g., an Apple Watch or a Fitbit) that can detect a heartbeat, blood pressure, O2, sugar, or any other health parameter. The monitoring device 100 or the accident notification server 200 can be configured to automatically confirm or classify accidents by evaluating the health parameter and the accident criteria in combination. For example, if a heartbeat is detected as being about zero, the accident can be classified as being associated with a possible death. Likewise, if a heartbeat is detected as being fast, the accident can be classified as being associated with shock. In one example, a user detected as experiencing a 3G shock, having a decrease in velocity of 100 miles per hour over 3 seconds, and having a heart rate of 150 beats per minute can be classified as being alive but in shock.

The method 130 can utilize one or more parameters and implement one or more functions automatically based upon logic that can evaluate a condition compared to the value of the parameter. Various exemplary and non-limiting examples of parameters and functions are provided below. It is furthermore noted that the default settings provided herein can be altered for compatibility with any desired smartphone 102.

Alternatively or additionally, the parameters can include min_movement_deviance_when_standing_still parameter that can have a setting of about 0.1. For example, if the monitoring device 100 detected a suspicious event (e.g., 2 out of 3 criteria met) check on the user 1 min from now. If the deviation of the 1 min from now buffer acceleration signals was less than the min_movement_deviance_when_standing_still parameter, the monitoring device 100 and the user can be considered stationary (unconscious) and the user can be alerted.

Alternatively or additionally, the parameters can include an after_accident_min_grav_dev parameter that can have a setting of about 0.2. If the deviation of the signals after the accident significantly dropped according to min_movement_deviance_when_standing_still parameter and the deviation of the acceleration signals after the accident are smaller than the after_accident_min_grav_dev parameter, then the user can be alerted.

Alternatively or additionally, the parameters can include a percent_of_max_possible_slope parameter that can have a setting of about 0.35 (about 35% of the theoretical maximum). The slope threshold can be the maximum available on the smartphone 102 multiplied by the percent_of_max_possible_slope parameter.

Alternatively or additionally, the parameters can include an integration_range parameter that can have a setting of about 100. The integration_range parameter set a range that is centered at a peak detected acceleration signal. For example, the speed change around the largest maxed out acceleration can be determined by integrating the signal starting at the point of the largest maxed out acceleration minus the integration_range parameter and ending at the point of the largest maxed out acceleration plus the integration_range parameter.

Alternatively or additionally, the parameters can include a potential_accident_analysis_time parameter that can have a setting of about 10000000000 (about 10 seconds). The potential_accident_analysis_time parameter can set the amount of time (nanoseconds) that the buffer is filed after a potential accident signal Alternatively or additionally, the parameters can include a buffer_time parameter that can have a setting of about 10000000000 (about 10 seconds). The buffer_time parameter can set the buffer length (nanoseconds) for the accelerometer of an algorithm.

Alternatively or additionally, the parameters can include a gps_refresh_time_when_speed_is_low parameter that can have a setting of about 120000. The gps_refresh_time_when_speed_is_low parameter can set the amount of time between GPS signal sampling, when the user is not on the move. When the speed is higher than a threshold level, the user can automatically be determined to be on the move. The GPS position can be sampled more often when the user is determined to be on the move such as, for example, about 30000 milliseconds (about 30 seconds) and the sensors can be activated.

Alternatively or additionally, the parameters can include a maxed_out_acceleration_value parameter that can have a setting of about 19.5. The maxed_out_acceleration_value can correspond to the maximum acceleration value that the motion sensor 116 (e.g., accelerometer) of the smart phone 102 sensors can measure, which can correspond to about 19.5 m/s$^2$ (about 2G force by default).

Alternatively or additionally, the parameters can include a after_accident_grav_multiplyer parameter that can have a setting of about 2. If the deviation of the signals after the accident multiplied by the after_accident_grav_multiplyer parameter is less than the deviation of the signals before the accident, the deviation value can be checked (below criteria). Accordingly, sudden stops can be detected. In another example, the motion can be checked 1 min later to determine if the smartphone 102 or user is stationary.

Alternatively or additionally, the parameters can include a freefall_limit_acceleration parameter that can have a setting of about 2.5. If the total detected acceleration is smaller than the freefall_limit_acceleration parameter, the smart phone 102 and the user can be determined to be free-falling.

Alternatively or additionally, the parameters can include a min_needed_speed_for_detection parameter that can have a setting of about 2.8 m/s (about 10 km/h). The min_needed_speed_for_detection parameter can set a threshold speed (m/s) for considering the smart phone 102 and the user to be on the move. The sensors and the accident detection can be activated when the threshold is met or exceeded.

Alternatively or additionally, the parameters can include a minimum_acceleration_slope parameter that can have a setting of about 2000. The slope of the acceleration (change of acceleration) can be adaptively calculated. The slope of the acceleration curve cannot be lower than the minimum_acceleration_slope parameter.

Alternatively or additionally, the parameters can include a min_needed_freefall_time parameter that can have a setting of about 250000000 (0.25 seconds). If the smart phone 102 is free-falling an amount of time (nanoseconds) that meets or exceeds the min_needed_freefall_time parameter in the time interval of the accident, then the smart phone 102 can be determined as having fallen from a significant height. For example, the height can be determined as Height=a*t*t/2. If the condition is true, the user can be alerted.

Alternatively or additionally, the parameters can include a min_integrated_speed_change parameter that can have a setting of about 2 in one embodiment, or about 3 m/s (about 11.5 km/h) in another embodiment. The integrated speed change should be at least the min_integrated_speed_change parameter (m/s) to be considered an accident.

Alternatively or additionally, the parameters can include a countdown_time parameter that can have a setting of about 60. If an accident happens, a countdown can occur for the countdown_time parameter (seconds).

Alternatively or additionally, the parameters can include a gps_refresh_time_when_speed_is_high parameter that can have a setting of about 30000. When the speed of the smart phone 102 is higher than a threshold level, the user can be considered to be moving. The GPS position can be sampled by the gps_refresh_time_when_speed_is_high parameter and the sensors can be activated.

Alternatively or additionally, the parameters can include a min_continuous_time_maxed_out parameter that can have a setting of about 30000000. The accelerometer has to be maxed out (19.5 m/s2) continuously for at least the min_continuous_time_maxed_out (nanoseconds) for the criteria to be met.

Alternatively or additionally, the parameters can co include comprise a abs_trigger_threshold parameter that can have a setting of about 40. The accelerometer absolute summed value has to be larger than the abs_trigger_threshold parameter for the criteria (e.g., potential accident) to be met.

Alternatively or additionally, the parameters can include a maximum_acceleration_slope parameter that can have a setting of about 3000. The slope of the acceleration (change of acceleration) can be adaptively calculated. The slope of the acceleration curve cannot be higher than the maximum_acceleration_slope parameter.

Alternatively or additionally, the parameters can include a check_if_speed_0_this_many_times_after_potential_accidents parameter that can have a setting of about 4. If two potential accident criteria are met from the three potential accident criteria, an event can be automatically considered to be a potential accident, check the next speed for a number of times equal to the check_if_speed_0_this_many_times_after_potential_accidents parameter. If one of the checks finds a speed of 0, then the potential accident can be considered to be an accident.

Alternatively or additionally, the parameters can include a min_total_time_maxed_out parameter that can have a setting of about 50000000. The accelerometer has to be maxed out (19.5 m/s2) for the min_total_time_maxed_out parameter (nanoseconds) in all the buffered parts to be considered an accident.

Alternatively or additionally, the parameters can include a check_the_user_after_suspicious_event_this_much_time parameter that can have a setting of about 60000 (about 60 seconds). If two of the potential accident criteria are met of the three potential accident criteria are met, an event can be considered to be a potential accident. The user can be checked after the check_the_user_after_suspicious_event_this_much_time parameter (milliseconds). If the smart phone 102 is stationary according to the accelerometer, then the potential accident can be considered to be an accident.

It is noted that the terms "about" and "substantially" may be used herein to represent the inherent degree of uncertainty that may be attributed to any quantitative comparison, value, measurement, or other representation. The term can also be used herein to represent the degree by which a quantitative representation may vary from a stated reference without resulting in a change in the basic function of the subject matter at issue.

While particular examples have been illustrated and described herein, it should be understood that various other changes and modifications may be made without departing from the spirit and scope of the claimed subject matter. Moreover, although various aspects of the claimed subject matter have been described herein, such aspects need not be used in combination. It is therefore intended that the appended claims cover all such changes and modifications that are within the scope of the claimed subject matter.

What is claimed is:

1. A portable device comprising:
a non-transitory memory to store machine readable instructions and data; and
a sensing system configured to generate a sensed signal indicative of one of a sensed motion and an audio detected by the sensing system, wherein the sensing system comprises an accelerometer configured to generate a plurality of acceleration measurements along axes for the portable device over a period of time;
a processor to access the non-transitory memory and execute the machine readable instructions, the machine readable instructions causing the processor to:
determine a jerk value for each axis of a plurality of axes of the accelerometer based on an absolute value difference between an earlier measured acceleration and subsequent measured acceleration over the period of time along a given axis, and further based on a time difference over the period of time between the earlier and subsequent acceleration measurements;

generate an alert based on the sensed signal and the determined jerk value;

encode an assistance request comprising location information for the portable device in response to the alert; and transmit the encoded assistance request to a server to cause the server to transmit an assistance summons request to one or more selected devices that a user associated with the portable device is need of assistance.

2. The portable device of claim 1, wherein the encoded assistance request further comprises selected device information associated with the one or more selected devices, the server being configured to transmit the assistance summons request to the one or more selected devices based on the selected device information.

3. The portable device of claim 2,
wherein the one or more selected devices corresponds to one or more selected mobile devices; and
wherein the selected device information comprises one or more phone numbers associated with the one or more selected mobile devices.

4. The portable device of claim 1,
wherein at least one of the one or more selected devices provides a confirmation message to the server to confirm that the user associated with the portable device is need of the assistance based on the assistance summons request; and
wherein the server is configured to transmit one or more notification messages to one or more emergency personnel requesting the assistance for the user, wherein the one more notification messages comprises one of a phone number associated with the portable device and the location information for the portable device.

5. The portable device of claim 4, wherein the assistance comprises emergency assistance.

6. The portable device of claim 1, wherein the accelerometer is configured to generate the plurality of acceleration measurements for the portable device over the period of time; wherein the portable device further comprises a global positioning system (GPS) receiver configured to provides one or more speed measurements for the portable device over the period of time; and wherein the machine readable instructions further cause the processor to monitor the plurality of acceleration measurements when the GPS receiver provides a speed measurement for the mobile device over the period of time greater than a speed threshold.

7. The portable device of claim 6, wherein the machine readable instructions further cause the processor to evaluate one or more accident criteria when a sum of absolute accelerometer values for each axis of the plurality of axes of the accelerometer is equal or greater to than an absolute accelerometer threshold.

8. The portable device of claim 7, wherein the one or more accident criteria comprises an absolute acceleration criteria characterizing an amount of time a given axis of the plurality of axis is greater than a given threshold.

9. The portable device of claim 8, wherein the machine readable instructions further cause the processor to: determine an amount of time that an absolute acceleration along at least one axis of the accelerometer is above a maxed_out_acceleration_value threshold; and evaluate the amount of time that the absolute acceleration along at least one axis of the accelerometer is above the maxed_out_acceleration_value threshold relative to a min_total_time_maxed_out threshold, and if the amount of time is greater than the min_total_time_maxed_out threshold, then evaluate each of the plurality of axes to determine if a given time for each of the plurality of axes is greater than a min_continious_time_maxed_out threshold, wherein min_continious_time_maxed_out threshold corresponds to the given threshold; and wherein the absolute acceleration criteria is satisfied when the given time for each of the plurality of axes is greater than the min_continious_time_maxed_out.

10. The portable device of claim 9, wherein the machine readable instructions further cause the processor to generate the alert in response to the absolute acceleration criteria being satisfied.

11. The portable device of claim 9, wherein the one or more accident criteria further comprises integration filter criteria.

12. The portable device of claim 11,
wherein the machine readable instructions further cause the processor to evaluate the jerk value for each axis of the plurality of axes relative to a jerk threshold; and
wherein the integration filter criteria is considered satisfied when the jerk value for an axis of the plurality of axes is greater than the jerk threshold.

13. The portable device of claim 12, wherein the machine readable instructions further cause the processor to generate the alert in response to both the absolute acceleration criteria and the integration filter criteria being satisfied.

14. The portable device of claim 1,
further comprising a display;
wherein the machine readable instructions further cause the processor to:
provide a user interface on the display comprising one or more objects, the one or more objects being associated with information identifying one or more candidates associated with one or more candidate devices;
receive one or more user inputs indicative of a selection of the one or more objects; and
transmit notification data to the server characterizing the one or more candidate devices associated with the selection of the one or more objects to alert in response to an accident of a user associated with the mobile device,
wherein the one or more candidate devices correspond to the one or more selected devices.

15. A system comprising:
a non-transitory memory to store machine readable instructions and data; and
a processor to access the non-transitory memory and execute the machine readable instructions, the machine readable instructions causing the processor to:
receive an assistance request generated by a portable device associated with a user, wherein the assistance request comprises location information for the portable device, wherein the portable device comprises an accelerometer configured to generate a plurality of acceleration measurements along axes for the portable device over a period of time, and wherein the portable device is configured to:
determine a jerk value for each axis of a plurality of axes of the accelerometer based on an absolute value difference between an earlier measured acceleration and subsequent measured acceleration over the period of time along a given axis, and further based on a time difference over the period of time between the earlier and subsequent acceleration measurements;
generate an alert based at least on the determined jerk value;

generate the assistance request in response to the alert; and transmit an assistance summons request to one or more selected devices that the user associated with the portable device is need of assistance.

16. The system of claim 15, wherein the assistance request further comprises selected device information associated with the one or more selected devices, the machine readable instructions further causing the processor to transmit the assistance summons request to the one or more selected devices based on the selected device information.

17. The system of claim 16, wherein the machine readable instructions further cause the processor to:

receive a confirmation message generated by at least one of the one or more selected devices confirming that the user associated with the portable device is need of the assistance based on the assistance summons request; and transmit one or more notification messages to one or more emergency personnel requesting assistance for the user, wherein the one more notification messages comprises one of a phone number associated with the portable device and the location information for the portable device.

18. The system of claim 15, wherein the machine readable instructions further cause the processor to:

receive notification data generated by the portable device characterizing one or more candidate devices to alert of a potential future assistance for the user, wherein the one or more candidate devices is associated with one or more objects selected in response to one or more user inputs;

wherein the portable device is configured to provide a user interface comprising the one or more objects and receive the one or more user inputs indicative of a selection of the one or more objects, and generate the notification data characterizing the one or more candidate devices to alert of the potential future assistance for the user.

19. The system of claim 18, wherein the machine readable instructions further cause the processor to:

transmit an acceptance request to the one or more candidate devices associated with one or more candidate users based on the notification data; and receive an acceptance response generated by one of the one or more candidate devices indicative of an acceptance to receive the assistance summons request, wherein the candidate device that generated the acceptance response request corresponds to a selected device of the one or more selected devices.

* * * * *